United States Patent [19]

Yanagiuchi et al.

[11] Patent Number: 4,642,761
[45] Date of Patent: Feb. 10, 1987

[54] DEDICATED I/O SERIAL BIT INTERFACE WITH PERIPHERAL SELECTION

[75] Inventors: Shigenobu Yanagiuchi, Tenri; Takuro Omori, Yamatokoriyama, both of Japan

[73] Assignee: Sharp Kabushiki Kaisha, Osaka, Japan

[21] Appl. No.: 870,669

[22] Filed: Jun. 2, 1986

Related U.S. Application Data

[63] Continuation of Ser. No. 526,524, Aug. 26, 1983, abandoned.

[30] Foreign Application Priority Data

Aug. 31, 1982 [JP] Japan .................... 57-152009

[51] Int. Cl.$^4$ ............................................. G06F 15/02
[52] U.S. Cl. ................................. 364/200; 340/365 R
[58] Field of Search ... 364/200 MS File, 900 MS File, 364/709; 340/365 R, 365 S; 235/145 R, 146

[56] References Cited

U.S. PATENT DOCUMENTS

| | | | |
|---|---|---|---|
| 4,064,560 | 12/1977 | Baxter | 340/365 S |
| 4,156,928 | 5/1979 | Inose | 364/900 |
| 4,396,985 | 8/1983 | Ohara | 364/900 |
| 4,398,250 | 8/1983 | Hosono | 364/900 |
| 4,460,957 | 7/1984 | Eggebrecht | 364/900 |

*Primary Examiner*—Raulfe B. Zache
*Assistant Examiner*—Florin Munteanu
*Attorney, Agent, or Firm*—Birch, Stewart, Kolasch & Birch

[57] ABSTRACT

A computer connected to at least one peripheral includes a memory, a program control circuit, an internal keyboard and a signal input/output device. The memory stores a program. The program control circuit is provided for controlling the computer according to the program. The peripheral is an external memory, an external input device, or the like. The signal input/output device is provided for connecting the computer and the peripheral to communicate data. Serial bit data transfer through data lines is used to send command control signals from the computer to the peripheral and for transfer of data between the computer and the peripheral. Control signals are sent on a control line to control the transmittal and reception of the command control signals and the data. When an external keyboard is selected as a peripheral, the internal keyboard may be disabled.

2 Claims, 8 Drawing Figures

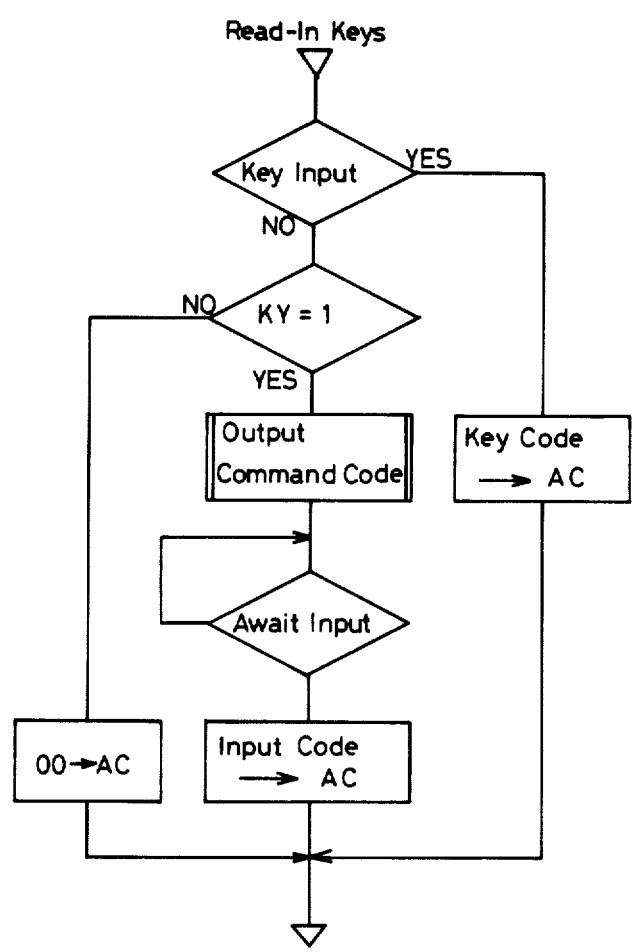
FIG. 6
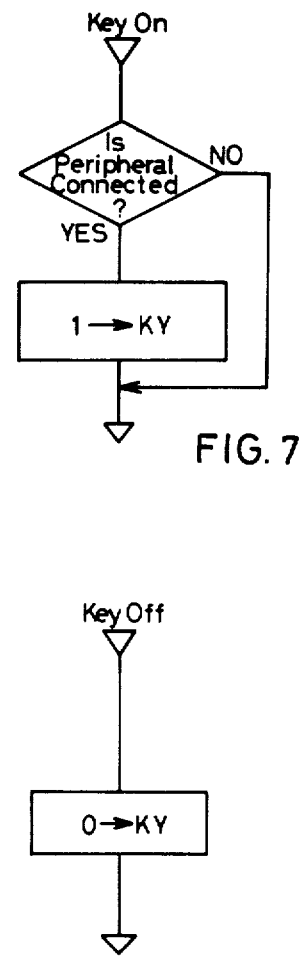
FIG. 7
FIG. 8

DEDICATED I/O SERIAL BIT INTERFACE WITH PERIPHERAL SELECTION

This application is a continuation of application Ser. No. 526,524 filed on Aug. 26, 1983, now abandoned.

BACKGROUND OF THE INVENTION

The present invention relates to a computer and, more particularly, to a control circuit for a computer to which at least one peripheral is connected.

Recently, many kinds of computers have been proposed which include a personal computer, a portable computer, and a pocket size computer. To these computers, a peripheral including an external memory, an input device or the like may be connected as an option. For example, a first keyboard is part of the main body of a computer, so that the first keyboard is actuated to input key information. A second keyboard may be connected to the main body of the computer, so that the second keyboard is also actuated to input key information. Otherwise, a memory such as a tape recorder may be connected to the main body of the computer, so that the tape recorder can provide any desired program or data.

For data communication between the computer and the peripheral, conventionally, a signal bus may be provided. In this system, it is advantageous that the peripheral be accessed at the same level as that of the computer. But, it is disadvantageous when the capacity of the signal data bus must be enlarged.

Otherwise, a signal transferring interface circuit may be provided. In this system, it is desirable to make the capacity of necessary signal lines small. But, it is disadvantageous if the data control between the computer and the peripheral is complex. In a computer of the type in which an external keyboard is connected to the computer, a command for reading in key input information must be different between a built-in keyboard and the external keyboard. This requires that some different command be applied during programming to the built-in keyboard and the external keyboard. Therefore, the alternative use of either the built-in keyboard or the external keyboard, in particular, with the same program requires complex control.

SUMMARY OF THE INVENTION

Accordingly, it is an object of the present invention to provide an improved computer for controlling a built-in device and an external device with common commands.

It is another object of the present invention to provide an improved control circuit for a computer for operating a built-in device and an external device with common commands.

It is a further object of the present invention to provide an improved control circuit for a computer for reading a built-in keyboard and an external keyboard with common commands.

It is a further object of the present invention to provide an improved control circuit for a computer for selectively controlling either a built-in keyboard or an external keyboard.

It is a still further object of the present invention to provide an improved control circuit for a computer to load a program as stored within a PROM into a RAM built in the computer. Briefly described, in accordance with the present invention, a computer for accepting a peripheral comprises a memory, a program control circuit, and a signal input/output device. The memory stores a program. The program control circuit is provided for controlling the computer according to the program. The peripheral is an external memory, an external input device, or the like. The signal input/output device is provided for connecting the computer and the peripheral to communicate data. Serial bit data transfer through data lines is used to transfer both the output of command control signals from the computer to the peripheral and the input/output of data signals for the data. Control signals are sent on a control line to control the transfer of the command control signals and the data.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIGS. 4 to 8 show each flow chart of the operation according to the present invention.

DESCRIPTION OF THE INVENTION

A control circuit of the present invention can be applied to any type of computer including a personal computer, a portable computer, and a pocket size computer. In a preferred form of the present invention, a personal computer is exemplified.

Figure 1:
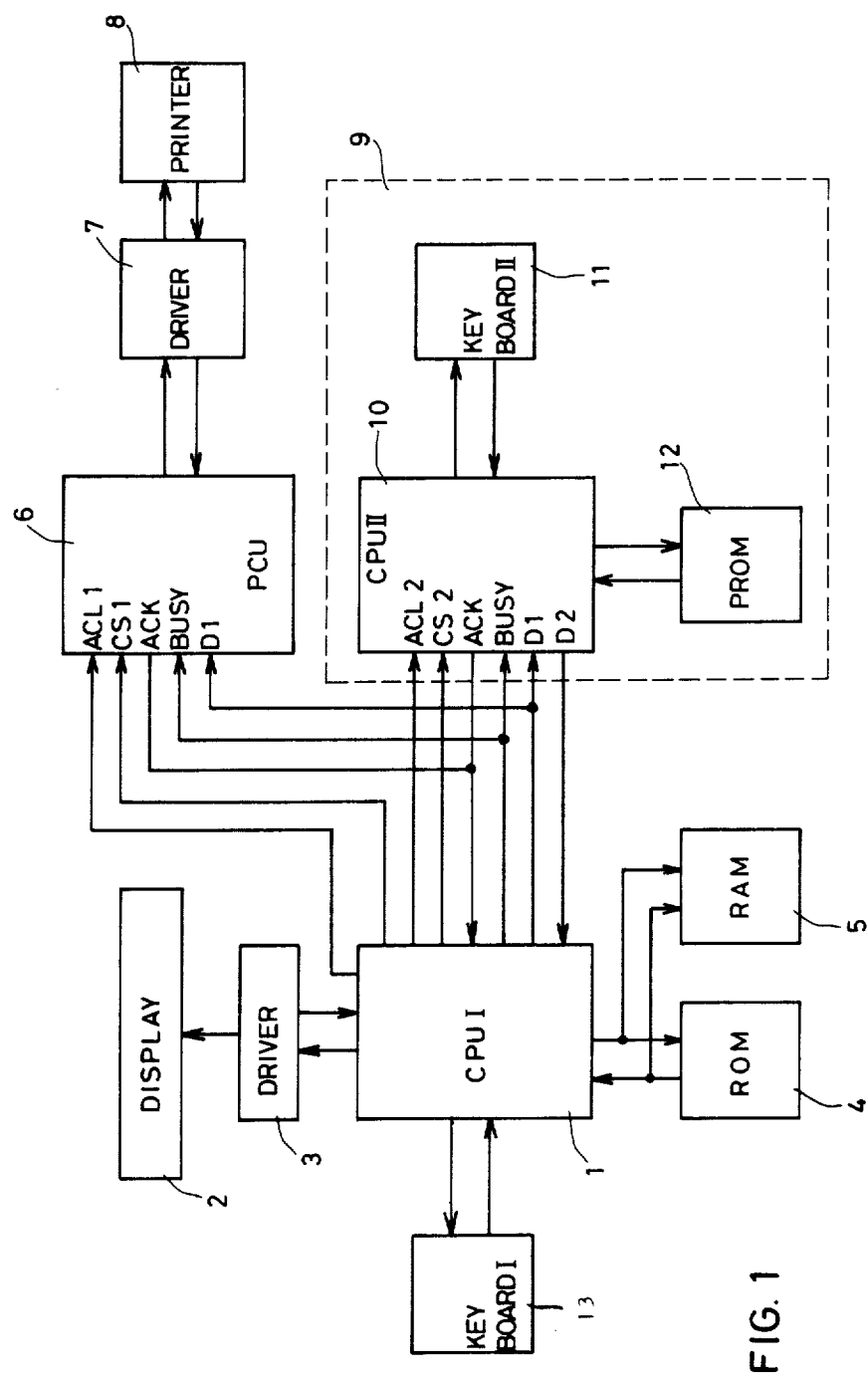
FIG. 1 shows a block diagram of a first control circuit implemented within a computer and a second control circuit in a peripheral according to the present invention.

FIG. 1 shows a block diagram of a first control circuit of such a personal computer and a second control circuit in a peripheral.

The control circuit of FIG. 1 comprises a CPU I 1, a display 2, a display driver 3, a read-only memory (ROM) 4, a random access memory (RAM) 5, a keyboard I 13, a printer controller (PCU) 6, a printer driver 7, and a printer 8, which are built in the computer.

The CPU I 1 provides key strobe signals to the keyboard I, so that key return signals are detected by the CPU I 1. The display 2 is a liquid crystal display. The display driver 2 is responsive to display signals from the CPU I 1 for controlling the display dots of the display 2. The ROM 4 stores an interpreter for permitting the computer to perform operations according to the program, and other control program. The RAM 5 serves as system areas for registers and flags, and a memory area for storing a program. The printer control unit or PCU 6 serves to control the printer 8 according to print data generated by the CPU I 1.

To the computer, a peripheral circuit 9 is connected comprising a CPU II 10, a programmable ROM (PROM) 12, and a keyboard II 11. The CPU II 10 serves to control the operation of the peripheral circuit 9. The keyboard II 11 is an external keyboard. The keyboard II 11 receives key strobe signals from the CPU II 10 to provide key return signals. The PROM 12 stores a program. The CPU II 10 is responsive to key input commands from the CPU I 1 for reading key conditions of the keyboard II 11 and for providing key codes toward the CPU I 1.

When the CPU II 10 receives program loading commands from the CPU I 1, it reads program data from the PROM 12 and sends them toward the CPU I 1. The CPU I 1 causes the RAM 5 to store the sent program data.

Between the CPU I 1 and the PCU 6 or between the CPU I 1 and the CPU II 10, "BUSY" signals and "ACKNOWLEDGE(ACK)" signals are used as handshake signals, while command between them are inputted/outputted according to data signals.

Each of signals "ACL1" and "ACL2" is a reset signals for the PCU 6 and the CPU II 10. Each of signals "CS1" and "CS2" is a select signal for the PCU 6 and the CPU II 10. The select signal is applied to select one CPU for data communication when a plurality of external CPUs are connected to the CPU I 1. The "ACK" signal is used to indicate that the external CPU including an external PCU and the CPU II 10 is responsive to the signal from the CPU I 1. The "BUSY" signal is used to indicate that the CPU I 1 is placed in busy conditions for data communication. A signal "D1" of the data signals is used to enable serial output of data from the CPU I 1 to the external CPU II 10. A signal "D2" of the data signals is used to enable the serial input of data from the CPU II 10 to the CPU I 1.

The data communication between the CPU I 1 and the external CPU II 10 is performed as follows:

The CPU I 1 provides the reset signal of "ACL1" or "ACL2" toward an external CPU to reset the external CPU. The CPU I 1 provides the select signal of "CS1" or "CS2", so that the external CPU is responsive to the select signal for providing the "ACK" signal toward the CPU I 1. The CPU I 1 is responsive to the "ACK" signal for transferring command codes toward the external CPU bit by bit. Bit signals are sent on the "D1" data line, so that the "BUSY" signal is generated. As the external CPU detects that the "BUSY" signal is generated, the external CPU accepts the data on the "D1" data line. After the external CPU accepts the data on the "D1" data line, it generates the "ACK" signal toward the CPU I 1. The CPU I 1 is responsive to the "ACK" signal for bearing a second bit on the "D1" data line and providing the "BUSY" signal toward the external CPU. In this manner, respective command codes are transferred from the CPU I 1 to the external CPU.

The external CPU is responsive to the command codes for operating according to the command codes. For example, to read key input information on the external keyboard and transfer the key input information toward the CPU I 1, the key input information is transferred from the CPU II 10 to the CPU I 1 in the similar manner, using the "D2" data line.

Figure 2:
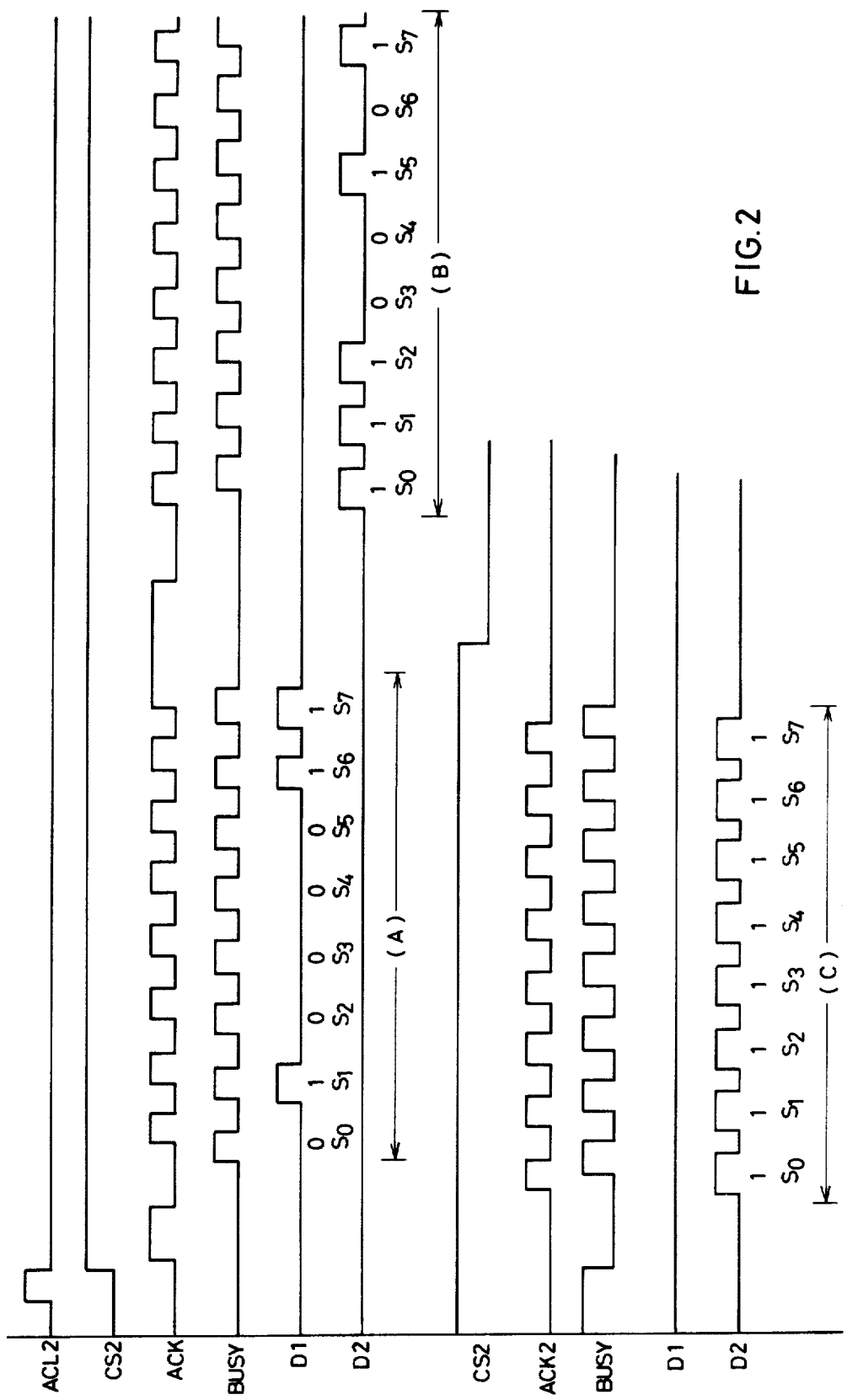
FIG. 2 shows a time chart of inputting data used for the present invention.

FIG. 2 shows a time chart of inputting or transferring the data from the external CPU to the CPU I 1 in the above case.

Figure 3:
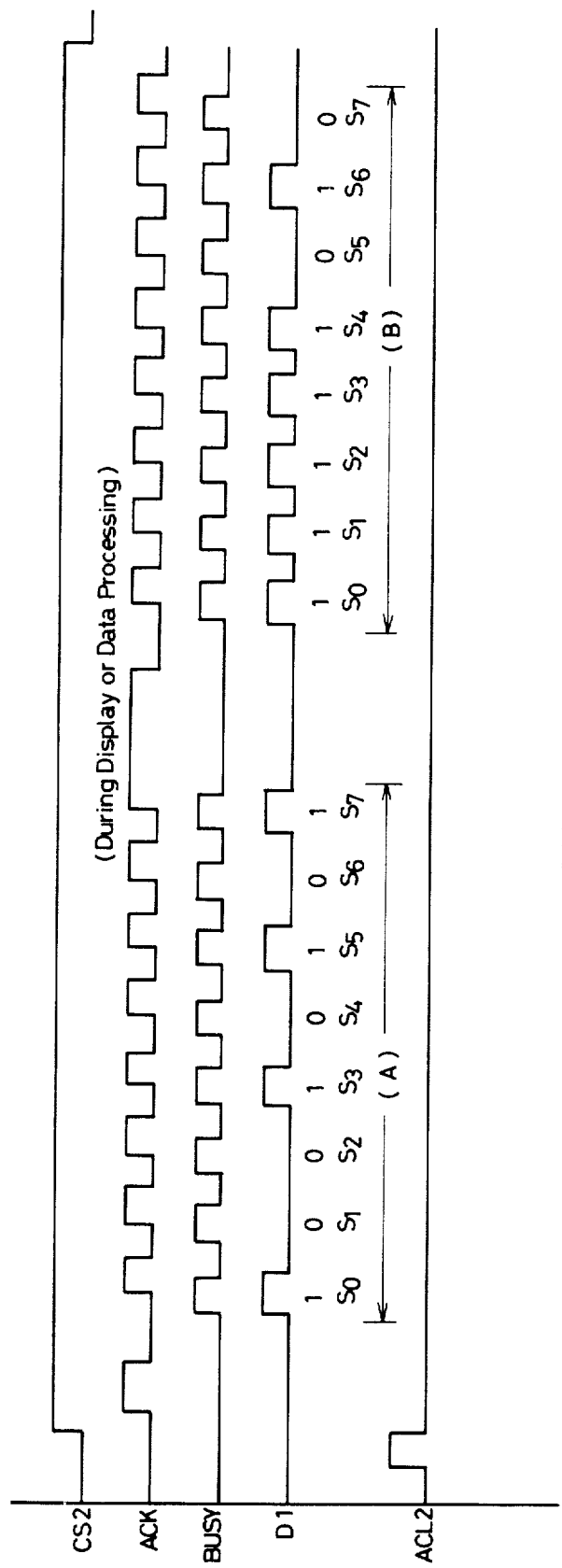
FIG. 3 shows a time chart of outputting the data used for the present invention.

With reference to FIG. 2, a first region (A) is referenced to describe timing when the command codes are transferred, a second region (B) and a third region (C) referenced to describe timing when the CPU II 10 provides data codes in response to the command codes. FIG. 3 shows a time chart of transferring data from the CPU I 1 to the external CPU II 10 after the command codes have been developed.

With reference to FIG. 3, a first region (A) is referenced to describe timing when the command codes are transferred, and a second region (B) is referenced to describe timing when the data codes are transferred.

Figure 4:
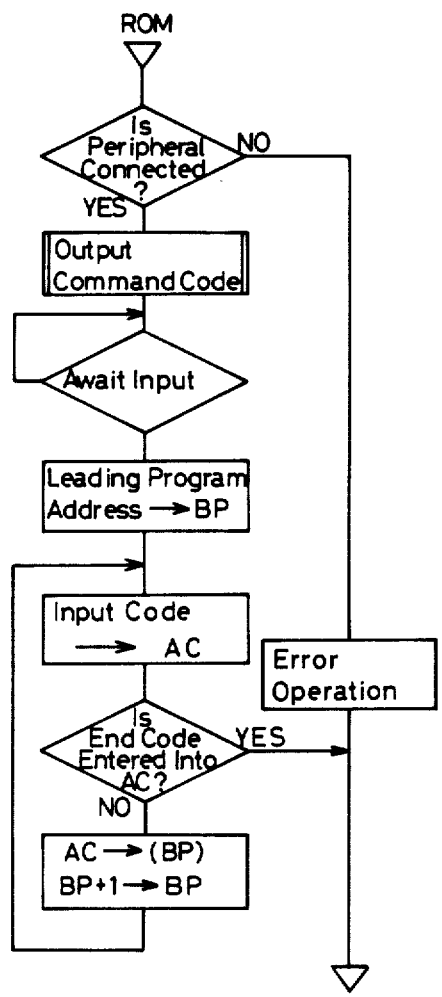

FIG. 4 shows a flow chart for performing a command of "ROM".

This command "ROM" is used to load the contents of the PROM 12 into the RAM 5. When the built-in keyboard I is actuated to input this "ROM" command, the interpreter is operated to decode this "ROM" command, so that the flow chart of FIG. 4 is carried out.

With reference to FIG. 4, the connection of any peripheral is first detected. This detection is enabled by detecting that the CPU II 10 provides the "ACK" signal at a predetermined time after the CPU I 1 provides the reset signal "ACL2" and the select signal "CS2" toward the CPU II 10. When no peripheral is connected to perform this command, an error operation is carried out.

When some peripheral is connected, the command codes are generated. The CPU I 1 is responsive to the response developed by the CPU II 10 for setting the leading address in an address pointer BP of the program region of the RAM 5. The CPU I 1 inputs input codes from the CPU II 10 to the program region of the RAM 5. The CPU I 1 causes the pointer BP to be advanced. This operation is repeated until the CPU I 1 receives an end code. Thus, the program of the PROM 12 is loaded into the built-in CPU I 1.

Figure 5:
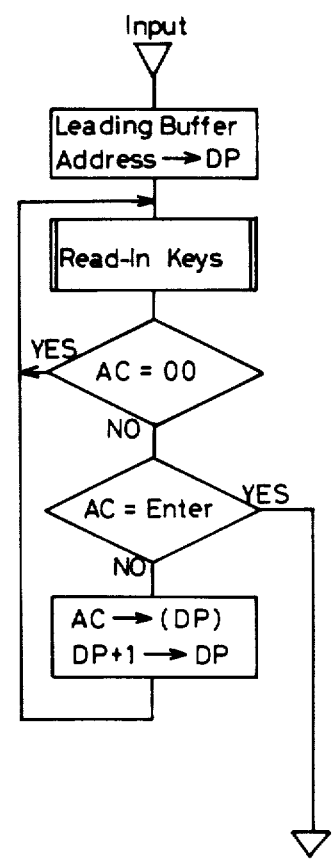

FIG. 5 shows a flow chart of performing key input commands used for the program.

An address pointer DP is set to store a leading address of a buffer for storing key input information. The conditions of the keyboard are read in as will be described later. The key codes are entered into an accumulator "AC". When "AC=00", namely, no key input operations are carried out, the key read-in routine is reselected. When the "AC" stores any key codes except "00", it is detected whether any of the codes is an "ENTER" code for entering the key input information or not. Unless one of the codes equal the "ENTER" code, the key codes are entered into a buffer, so that the pointer DP is advanced. When the "ENTER" key is actuated, this operation ends.

Unless the peripheral comprising an external keyboard is connected, the built-in keyboard is subjected to the key read-in routine. When some peripheral comprising the external keyboard is connected, the external keyboard is selectively subjected to the key read-in routine.

FIG. 6 shows a more detailed flow chart of reading in key input information of FIG. 5.

It is detected whether any key of the built-in keyboard I is actuated. When actuated, the key input code is entered into the accumulator "AC". If not actuated, the condition of a flag "KY" is detected. The condition of "KY=1" references a mode where the keyboard of the peripheral is used for read in, also. When "KY=1", the CPU I 1 provides the command codes toward the CPU II 10, so as to await the response. The CPU I 1 input the key codes from the CPU II 10 into the "AC". When "KY=0", the CPU I 1 inputs "00" into the "AC", so that the key read-in routine ends.

FIG. 7 shows a flow chart of causing the keyboard II 11 of the external CPU to be placed in a mode so that the keys of the keyboard II 11 can be read in. For this purpose, a command of "KEYON" is provided.

The command of "KEYON" is key inputted or included within the program. When some peripheral is connected, the flag "KY" is set. If not connected, no operations are conducted.

FIG. 8 shows a flow chart of reading key input information on the built-in keyboard I.

For this purpose, a command of "KEYOFF" is provided. This command is key inputted or included within the program. This command causes the flag "KY" to be reset.

While only certain embodiments of the present invention have been described, it will be apparent to those skilled in the art that various changes and modifications may be made therein without departing from the spirit and scope the present invention as claimed.

What is claimed is:

1. A computer system comprising:
   a plurality of computer peripherals;
   a general purpose digital computer including,
      a first keyboard developing a first key code set, and
      peripheral selection means for selecting a selected peripheral from said plurality of peripherals by generating a selection signal uniquely specifying said selected peripheral and for generating a reset signal to reset said selected peripheral, and
      means for developing command codes to control said selected peripheral; and
   serial data transfer means, coupling said computer and each said computer peripheral, for communicating said command codes to said selected peripheral and for bidirectionally communicating data between said selected peripheral and said computer;
   each said computer peripheral including acknowledgement means for sensing said selection signal, for determining whether it is said selected peripheral, and for developing an acknowledge signal communicated to said computer by said serial data transfer means;
   a first peripheral of said plurality of peripherals including a second keyboard also developing said first key code set,
   said computer further including keyboard selection means, responsive to said peripheral selection means, for enabling said first keyboard when said first peripheral is not selected as said selected peripheral;
   said keyboard selection means being further responsive to selection of said first peripheral as said selected peripheral by said peripheral selection means, for selectively enabling either said first keyboard or said second keyboard.

2. The system according to claim 1 wherein said first peripheral includes a programmable read only memory (PROM) containing program information which, upon selection of said first peripheral as said selected peripheral by said peripheral selection means, is transferred by said serial data transfer means to said digital computer, said digital computer including random access memory (RAM) for receiving said program information.

* * * * *